United States Patent

[11] 3,589,254

| [72] | Inventor | Bruce K. Johnson |
| | | Andover, Mass. |
| [21] | Appl. No. | 716,051 |
| [22] | Filed | Mar. 26, 1968 |
| [45] | Patented | June 29, 1971 |
| [73] | Assignee | Polaroid Corporation |
| | | Cambridge, Mass. |
| | | Continuation-in-part of application Ser. No. 681,761, Nov. 9, 1967, now abandoned. |

[54] EXPOSURE CONTROL MECHANISM FOR A PHOTOGRAPHIC CAMERA
13 Claims, 11 Drawing Figs.

[52] U.S. Cl............................................. 95/11,
  95/11.5, 240/1.3, 240/37.1
[51] Int. Cl................................................ G03b 15/03
[50] Field of Search........................................... 95/11, 11.5,
  31, 11 L, 10 C; 240/1.3, 37:1, 37

[56] References Cited
UNITED STATES PATENTS

| 3,326,103 | 6/1967 | Topaz........................... | 95/10 C |
| 3,353,467 | 11/1967 | Ernisse et al................. | 240/37.1 X |
| 3,369,468 | 2/1968 | Sapp et al..................... | 240/1.3 X |
| 3,374,720 | 3/1968 | Harvey......................... | 240/1.3 X |
| 3,466,992 | 9/1969 | Wick et al..................... | 240/1.3 X |

Primary Examiner—John M. Horan
Assistant Examiner—Alan Mathews
Attorneys—Brown and Mikulka, William D. Roberson and James L. Neal ABSTRACT: This disclosure involves an exposure control mechanism for a photographic camera which includes means for mounting a multilamp photoflash assembly and means for indexing the assembly in response to operation of the camera shutter to locate successive lamps for ignition during successive photographic exposures.

3,589,254
SHEET 1 OF 4
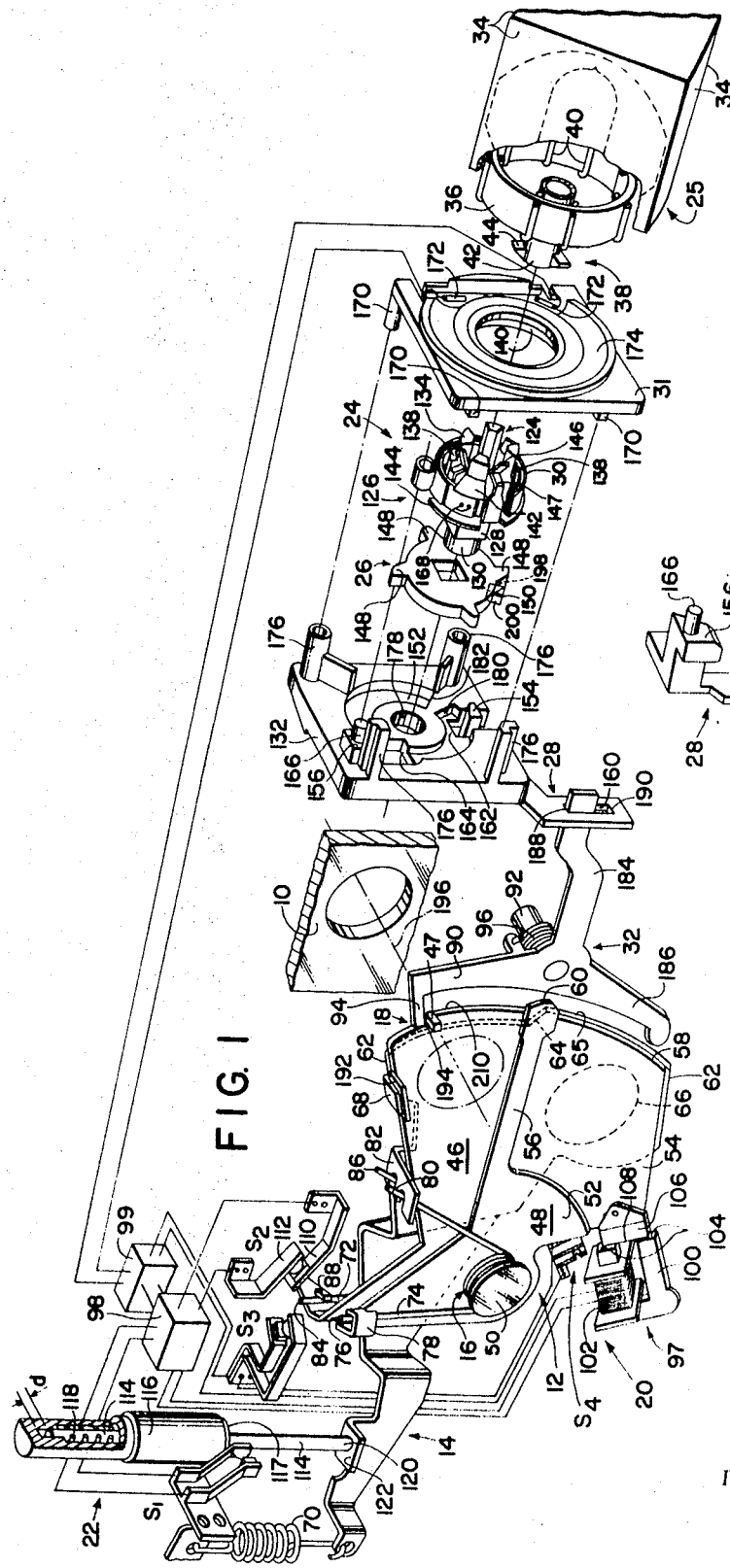
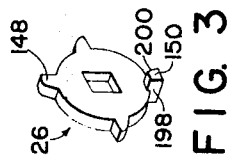
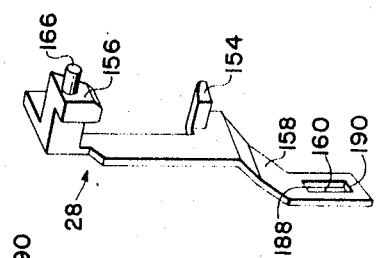
INVENTOR.
Bruce R. Johnson
BY Brown and Mikulka
and
James L. Neal
ATTORNEYS

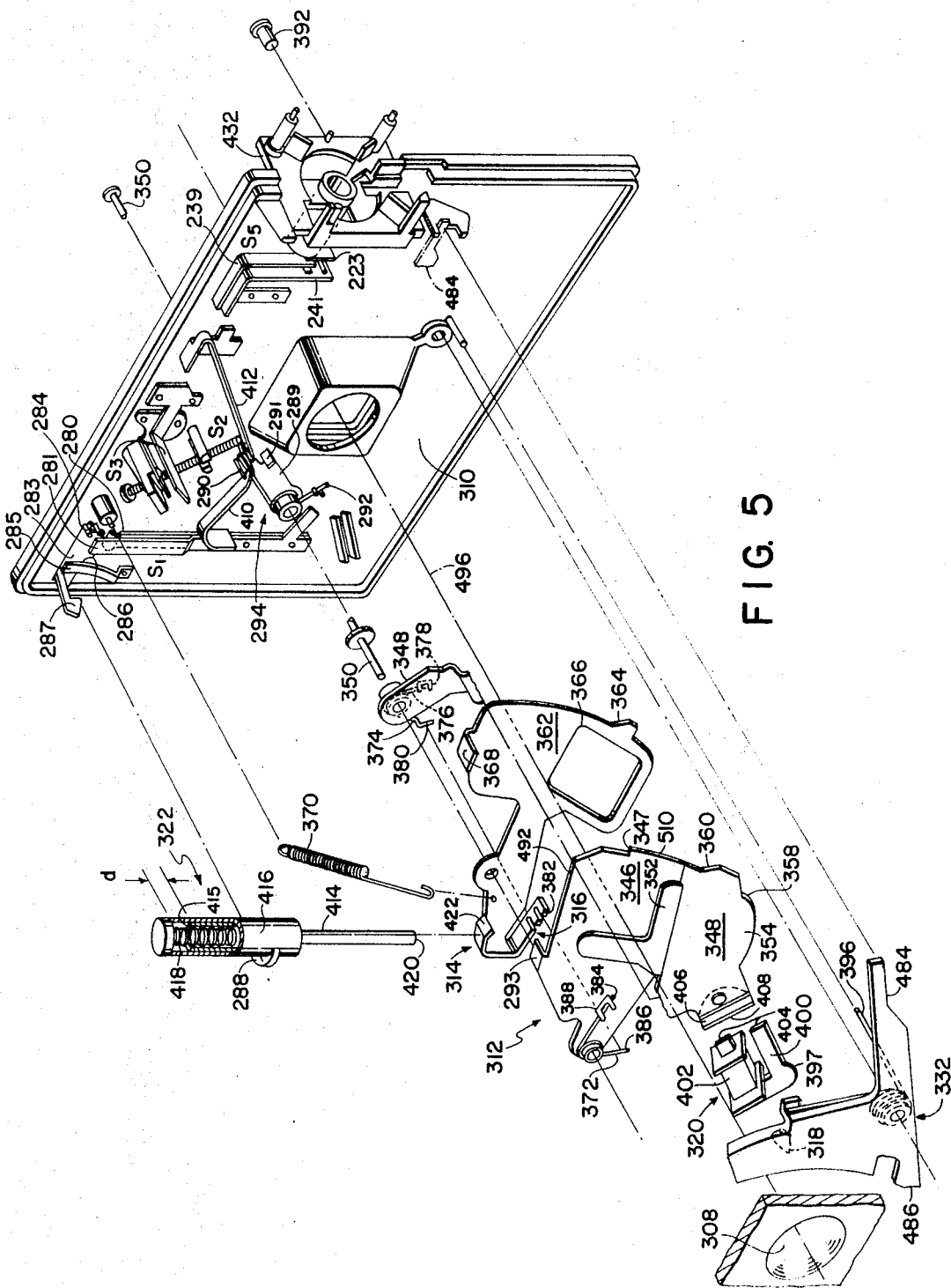

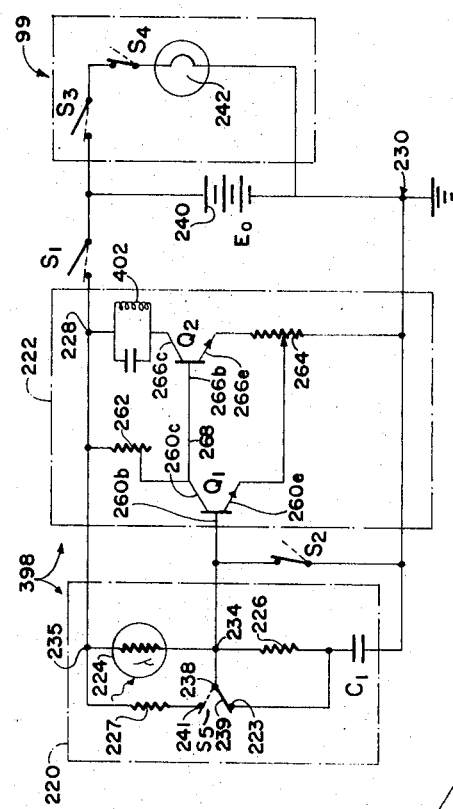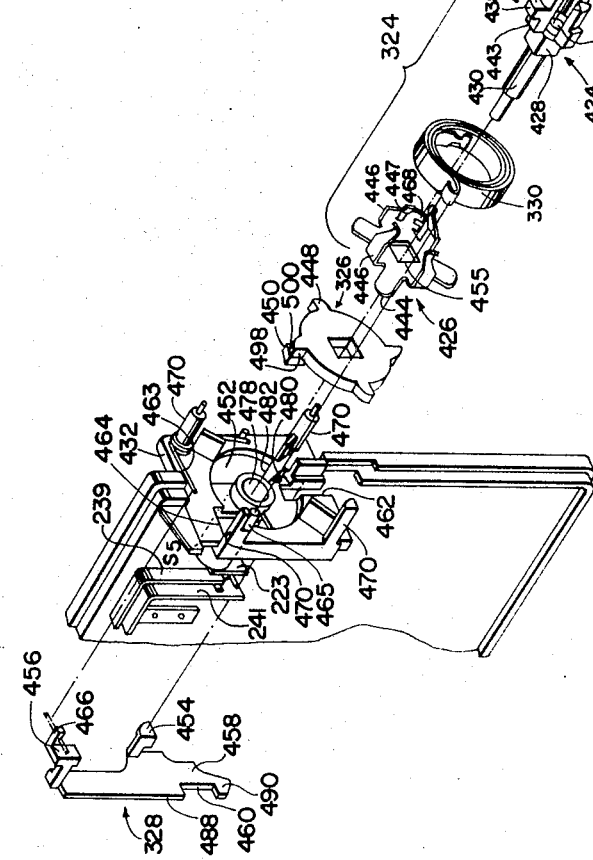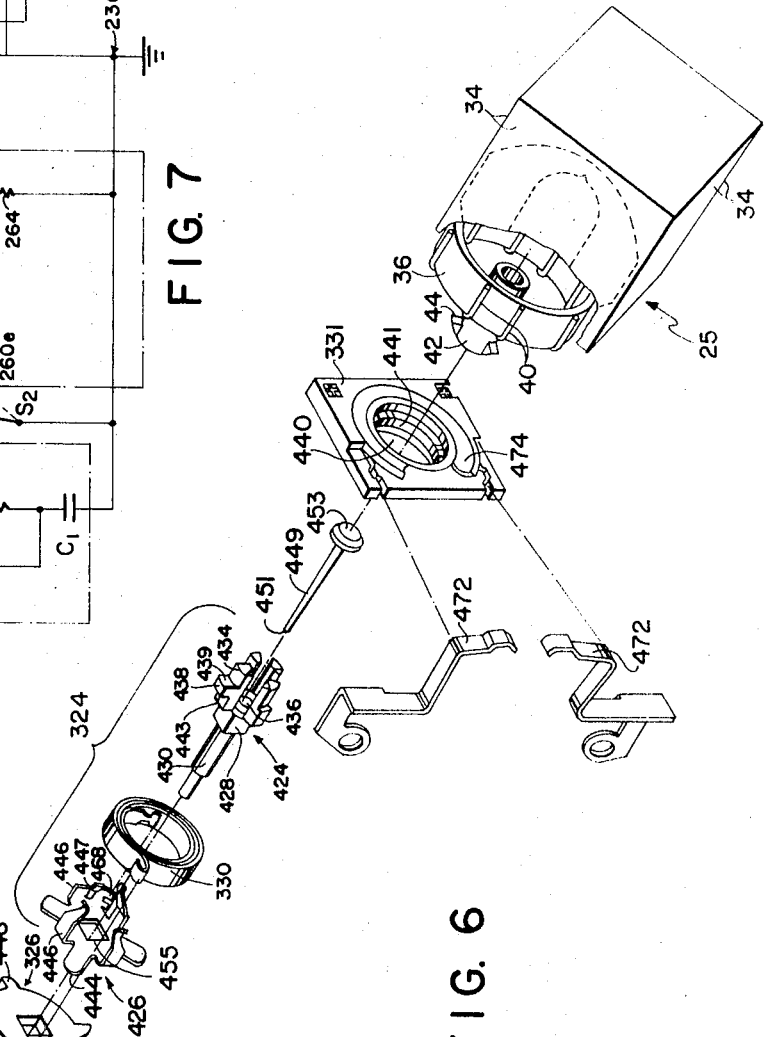

3,589,254

1

EXPOSURE CONTROL MECHANISM FOR A PHOTOGRAPHIC CAMERA

CROSS REFERENCE TO RELATED APPLICATION

This application is a continuation-in-part of application Ser. No. 681,761, entitled "Exposure Control Mechanism for a Photographic Camera," filed Nov. 9, 1967, in the name of Bruce K. Johnson, now abandoned.

SUMMARY OF THE INVENTION

This invention contemplates an exposure control mechanism for a photographic camera which mechanism includes a shutter, means for mounting a multilamp photoflash assembly and means for indexing the assembly in response to exposure producing operation of the shutter.

One lamp of the assembly is included within a photoflash lamp circuit for ignition in timed relationship to exposure producing operation of the shutter.

In response to shutter operation, and subsequent to ignition of the one lamp, the indexing means indexes the multilamp photoflash assembly to include another lamp in the photoflash circuit for ignition during a subsequent exposure.

It is an object of this invention to provide photographic apparatus operable in a photoflash mode in which a photoflash lamp is ignited in timed relationship to each photographic exposure producing operation and replenished automatically subsequent to ignition.

It is a further object to provide a photographic camera including exposure control apparatus with means for detachably receiving a unit containing a plurality of photoflash lamps, and means for advancing the unit in response to exposure production to locate successive photoflash lamps for ignition in timed relationship to successive exposure productions.

Other objects of the invention will in part be obvious and will in part appear hereinafter.

BRIEF DESCRIPTION OF THE DRAWINGS

FIG. 1 is a partially exploded perspective view of one embodiment of the invention;

FIG. 2 is a perspective view of an element of the apparatus of FIG. 1;

FIG. 3 is a perspective view of another element of the apparatus of FIG. 1 showing the side thereof opposite the side shown in FIG. 1;

FIGS. 5 and 6 show a preferred embodiment of this invention in exploded perspective; and FIG. 7 is a schematic representation of a control circuit usable in conjunction with the apparatus of FIGS. 5 and 6.

DETAILED DESCRIPTION OF THE DRAWINGS

Figure 4A:
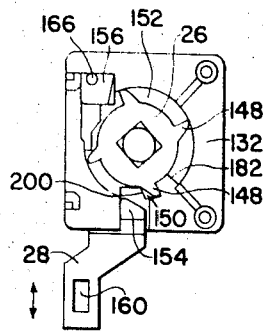
FIGS. 4a through 4e are plan views showing certain elements of the apparatus of FIG. 1 in various stages of operation.

Reference is now made to FIG. 1 wherein one embodiment of this invention is shown. The apparatus includes means 10 defining an exposure aperture, shutter 12, control means 14, drive means 16, latch means 18, retaining means 20 and operating means 22.

The apparatus further includes socket means 24 for detachably receiving multilamp photoflash assembly 25, escapement wheel 26 mounted beneath the socket means, slide 28 for controlling movement of the escapement wheel, drive spring 30 for rotatably biasing the escapement wheel, cover 31, base 132 and motion-transmitting means 32 extending from latch means 18 to engagement with slide 28 for transmitting motion of shutter 12 to slide 28.

Multilamp photoflash assembly 25 may, for example, be of the type illustrated in FIG. 1. This package comprises a generally cubic housing supporting a photoflash lamp and an individual reflector therefor in each of its four faces designated by the numeral 34. The assembly is provided with a base portion defining contact supporting ring 36 and mounting structure 38. The contact ring locates terminals 40 from each bulb for selective contact with a pair of cooperating terminals included within the package rotating apparatus, as will be subsequently described. The mounting structure includes a depending cylindrical center post 42 and four outwardly extending lugs 44 spaced uniformly about the outward extremity of the post. The structure mates with socket means 24, to be subsequently described.

Shutter 12 includes opening blade means 46 and closing blade means 48, each pivotally mounted upon hub 50 for aperture blocking and unblocking movement. The closing blade means includes support portion 52 and blade portion 54. The support portion is pivotally mounted upon hub 50, in overlying relationship to opening blade means 46. Blade portion 54 is mounted upon support portion 52 so that it lies in coplanar relationship with blade 46. In the position of FIG. 1, an edge of blade portion 54 abuts an edge of blade 46. Elongated portion 56 of support 52 forms a light seal along the abutting edges. Blade 48 also includes surface 58 and cam 60. Blade 46 includes offset 57.

Control means 14 comprises a capping blade 62 pivotally mounted upon hub 50 for movement between first and second positions. The capping blade forms cam 64 and aperture 66 and supports abutment 68. Cam 64 is located radially inwardly of cam 60 on blade 48 for purposes which will hereafter be apparent. The abutment extends into the path of movement of the opening blade means and, due to the abutting relationship of the opening and closing blades, limits counterclockwise movement of both the opening and closing blades. Spring 70 continuously biases the capping blade in a clockwise direction toward its first position. When the capping blade moves toward its first position, abutment 68 engages opening blade 46 and urges the opening blade and closing blade 48 clockwise, toward their respective aperture blocking and unblocking positions. Retaining means 20 is positioned adjacent the aperture unblocking position of closing blade 48 for limiting clockwise motion. Since spring 70 continuously biases the control means in the clockwise direction, blade 48 is continuously and firmly pressed against the retaining means, for reasons which will hereafter be described.

Drive means 16 includes drive springs 72 and 74 for blade 46 and blade 48, respectively. Spring 74 is coiled about hub 50 and includes end portion 76 which extends outwardly from hub 50 and engages closing blade 48 at 78 and end portion 80 which extends outwardly from the hub and engages control means 14 at 82. Similarly, spring 72 is coiled about the hub and includes end portions 84 and 86 which extend outwardly from the hub and engage opening blade 46 at 88 and control means 14 at 82, respectively. Drive spring 72 is preloaded to bias the opening blade for counterclockwise rotation, about the hub while biasing the capping blade for clockwise rotation, thus biasing the opening blade against the abutment 68 of the capping blade. Similarly, spring 74 is preloaded to bias the closing blade for counterclockwise rotation about the hub while biasing the capping blade for clockwise rotation so that the closing blade is biased against the opening blade. All three of the above described blades may be moved together, as a unit, without influencing the condition of drive springs 72 and 74; the condition of the drive springs being affected only when there is relative motion between the blades. The preloaded condition of the springs serves to maintain the elements in their proper relative positions when the apparatus is in the rest position.

Latch means 18 for releasably holding opening blade 46 in its aperture blocking position against the bias of spring 72 includes arm 90 pivotally mounted upon pin 92, projection 94 extending from the end of arm 90 for releasably engaging an offset portion 47 of opening blade 46 and spring 96 for exerting a counterclockwise bias upon arm 90.

Retaining means 20 may comprise, for example, electrical control circuit means 98, electromechanical holding device 97 and switches $S_1$ and $S_2$.

One example of a control circuit suitable for use with retaining means 20 is disclosed in U.S. Pat. No. 3,205,802, which issued to R. R. Wareham on Sept. 14, 1965. The circuit includes a photoresponsive element, such as a cadmium sulfide photoconductor, arranged to receive light from the scene being photographed and having a resistance which is functionally related to the intensity of scene light. The timing operation of the circuit is responsive to the resistance value of the photoresponsive element.

A photoflash circuit 99 may be associated with the control circuit. It may incorporate a pair of flash contacts 172, a flash ignition switch $S_3$ which when closed completes circuit 99 for igniting a flash lamp and safety switch $S_4$ for opening circuit 99 after switch $S_3$ is closed. Switch $S_3$ is biased open and positioned to be closed by aperture unblocking movement of opening blade means 46. Switch $S_4$ is biased open and held closed by closing blade means 48 when the closing blade means is in its aperture unblocking position. When the closing blade means begins to move toward its aperture blocking position, $S_4$ opens according to its bias.

The electromechanical holding device may involve an electromagnet including U-shaped core 100 and electrically energizable coil 102 wound around one leg of the core, coil 102 being included in circuit 98. The free ends, 104, of the core are coplanar and cooperable with magnetizable keeper 106 mounted upon closing blade means 48. The core of the electromagnet is positioned adjacent the aperture unblocking position of the closing blade means for contact with the keeper when the closing blade is in the aforesaid aperture unblocking position, the core and keeper being so arranged that surface 108 of the keeper contacts surfaces 104 of the U-shaped core to define a magnetic circuit. When the electromagnet is energized, a sufficient magnetomotive force is applied to the magnetic circuit to hold the keeper against the core and thus retain the closing blade in aperture unblocking position.

Switch $S_1$ is normally open and is closed by initial operation of operator means 22 to energize the timing circuit means. Switch $S_2$ may include poles 110 and 112 wherein pole 110 is normally biased out of contact with pole 112 and adapted to be thrown into contact therewith when opening blade means 46 is in its initial position. Switch $S_2$ is operative in conjunction with timing circuit means 98 and coil 102 included therein, for controlling exposure interval duration.

Operator means 22 includes shaft 114, knob 116 and spring 118. The shaft is mounted for reciprocal movement relative to hub 50; end 120 thereof is engageable with offset 122 of control means 14 for imparting counterclockwise rotation to the control means when the operator means is moved downwardly. Spring 118 biases knob 116 and shaft 114 in opposite directions axially of the shaft. Spring 118 is substantially weaker than spring 70 so that, upon depression of knob 116, the knob will move downwardly through distance "d" before movement is imparted to the shaft. The knob includes cam 117 for operating switch $S_1$.

Socket means 24 includes element 124 and member 126. Element 124 has angularly configured collar 128 for fixedly mounted escapement wheel 26 relative thereto and circular shaft portion 130 extending from the collar for rotatably mounting element 124 in support plate 132. The element further includes four equally spaced extensions 134 which form central opening 136. A pair of opposed extensions include bearing shoulders 138 for cooperation with thrust bearing 140 on member 31. The other pair of opposed extensions include bearing shoulders 142. Shoulders 142 are larger than shoulders 138 to act as retainers for spring 30 as well as to cooperate with bearing surface 140. Member 126 comprises flat platelike portion 144 from which four spring fingers 146 have been struck and bent upward for locations between extensions 134. An opening, not shown, having a shape complementary to that of collar 128 and is disposed centrally of portion 144 so that member 126 may be mounted upon the collar, rangement, assembly 25 is releasably retained in the socket means upon insertion of post 42 into opening 136 such that lugs 44 are located between extensions 134. As the post is inserted, spring fingers 146 are cammed outward and over the lugs, into retaining engagement with them. Assembly 25 is removed by simple pulling it from the socket means with sufficient force to again cause spring fingers 146 to cam over lugs 44.

Escapement wheel 26 is mounted, as aforesaid, upon collar 128 of element 134. Four teeth 148 extend radially from the wheel for cooperation with slide 28 and projection 150 extends from one tooth for cooperation with circular slot 152 in base 132.

Slide 28 carries first pallet 154 and second pallet 156 and is mounted in base 132 for reciprocal sliding movement. Movement of slide 28 permits controlled rotation of escapement wheel 26 and hence socket means 24. Extension 158 of the slide forms opening 160 for operatively receiving motion-transmitting member 32. Opening 160 is elongated to permit a predetermined amount of movement of the motion-transmitting member without movement of the slide. This slide is mounted beneath base 132 and pellets 154 and 156 extend through openings 162 and 164 of the base for their engagement with the escapement wheel. Post 166 extends upwardly from pallet 156.

Drive spring 30 comprises a coil spring wound about a core formed by curved surfaces of extensions 134 of element 124. One end of the spring is fixedly mounted to one of the extensions 168; the other end is attached to post 166 on slide 28. The spring is would to bias the rotary parts for counterclockwise movement and to bias the slide for movement in upward direction.

Cover 31 includes thrust bearing 140, members 170, terminals 172 and channel 174. Terminals 172 cooperate with terminals 40 to place the flash lamp directed toward the scene to be photographed in photoflash circuit 99. Channel 174 permits unobstructed movement of terminals 40 as the photoflash lamp assembly rotates. Members 170 cooperate with members 176 of base 132 to mount the cover to the base so that socket means 24, drive spring 30 and wheel 26 are supported between them. Shaft 130 extends through circular opening 178 in the base; bearing shoulders 138 and 142 are retained by thrust bearing 140.

Circular slot 152 in base 132 includes an interrupted sector which defines ends 180 and 182 for controlling photoflash lamp package rotation as hereafter described.

Motion-transmitting means 32 extends from latch means 18 as an integral part thereof and comprises finger 184 which extends through opening 160 in the slide and stop 186. Spring 96 biases member 32 and latch means 18 for counterclockwise rotation about pivot 92, thus finger 184 urges the slide upward. The finger will normally engage upper extremity 188 of opening 160. Motion-transmitting means 32 is movable through first and second increments of clockwise rotation, as will hereafter be explained. The first increment of clockwise rotation advances the finger a predetermined distance downwardly to lower extremity 190 of opening 160. Downward motion is so limited that the finger is not sufficiently advanced to transmit motion to the slide. Stop 186 extends motion-transmitting member to positively limit downward motion of finger 184 until other operations take place. When the second increment of downward motion is imparted to the finger, it drives slide 28 downward against the bias of spring 30.

The events which occur as a result of downward movement of knob 116 and shaft 114 to initiate exposure will now be described.

Reference will now be made to FIGS. 1 and 4a wherein the apparatus is shown in the rest position. Opening blade 46 and closing blade 48 are in abutting relationship so that clockwise movement of the opening blade produces similar movement of the closing blade. Spring 70 continuously biases control means from the control means into engagement with surface 192 of the opening blade so that the clockwise bias of the control means also biases the opening and closing blades for the same movement. Core 100 of the electromagnet is located so that surfaces 104 thereof are contacted by surface 108 of keeper 106 upon blade 46 to limit clockwise movement of blades 46, 48 and 62 so that blades 46 and 62 are located in their aperture blocking positions and blade 48 is located in aperture unblocking position. Since spring 70 continuously biases the blades for clockwise movement, keeper 106 is continuously pressed into firm contact with surfaces 104 of the core. A small tolerance gap 194 is formed by the opening blade and latch means 18.

The photoflash apparatus is shown in its unwound condition wherein socket means 24 is so positioned that each of the four faces 34 of assembly 25 are oriented at approximately a 40° angle relative to the plane of the scene to be photographed (i.e. relative to a plane perpendicular to the optical axis 196). In this condition, surface 198 of projection 150 abuts end portion 180 of slot 152 to prevent further rotation of the assembly and to locate teeth 148 of the escapement wheel so that pallets 154 and 156 of slide 28 do not intercept the teeth upon up and down movement thereof. In the unwound condition, the aforesaid 40° orientation of assembly 25 serves to indicate that a fresh photoflash lamp supply is needed.

To initiate operation, a photoflash lamp package, or assembly, designated 25, is inserted into the socket means. The package is then rotated clockwise to tension drive spring 30. As the rotation occurs, projection 150 travels in circular slot 152 until surface 200 thereof abuts end 182 of the slot. The ends of the slot are so located that the photoflash lamp package moves through an angular rotation of approximately 320°. The shapes of pallets 154 and 156 and teeth 148 of the escapement wheel are such that clockwise rotation of the socket means and escapement wheel is freely permitted. Upon release of the package, the tension and drive spring 30 advances socket means 24 and escapement wheel 26 through a 10° counterclockwise rotation to the position shown in FIG. 4b so that one face of the package is directed toward the scene to be photographed, and one of the teeth 148 is releasably retained against rotation under the influence of drive spring 30 by first pallet 154. The 10° overtravel is provided to insure that a tooth 148 is engaged by pallet 154. In this position, the terminals for the one flash lamp directed toward the scene to be photographed are in electrical contact with terminals 172 of the photoflash apparatus. The one flash lamp is thus positioned in the photoflash circuit to be ignited in timed relationship with exposure producing operation of the shutter means.

Referring again to FIG. 1, knob 120 is displaced to initiate exposure producing operation of the apparatus. Initial downward movement of the knob through distance "d" causes switch operating cam 117 thereon to close the contacts of switch $S_1$. Closure of switch $S_1$ energizes timing circuit 98 and coil 102 of an electromechanical holding device 97 to prevent forward movement of closing blade means 48 according to the bias of its drive spring, which movement would otherwise occur upon the subsequent movement of blade 46. Energization of the coil provides, in the magnetic circuit of core 100 and keeper 106, a magnetic induction sufficiently large to create a force on the keeper for holding the closing blade in its initial position against the bias of its drive spring independently of movement of opening blade 46.

Further downward movement of the knob effects downward movement of shaft 114. End 120 thereof engages offset 122 of control means 14 and rotates the control means counterclockwise from its first position toward its second position, against the bias of spring 70. Movement of the control means removes abutment means 68 from engagement with surface 192 of the opening blade. The opening blade moves slightly within its aperture blocking position to close gap 194 and is releasably held in aperture blocking position by latch means 18.

Counterclockwise movement of control means 14, while movement of the opening and closing blade is arrested, "winds" drive springs 72 and 74 to store a predetermined amount of energy therein in addition to the energy stored therein due to the preloaded condition. Control means 14 ultimately reaches a position wherein cam surface 64 engages projection 94 of latch means 18. A further increment of movement carries the control means to its second position wherein it lies in unblocking relationship with the exposure aperture. The aforesaid further increment of movement causes cam surface 64 to move projection 94 clockwise, off opening blade 46, to release the opening blade for movement. Projection 94 continues to ride upon raised surface 65 of cam 64 and thereby prevents return movement of the latch under the influence of biasing spring 96. Movement of the latch causes a first clockwise movement of finger 184 and stop 186. The finger is moved downwardly within slot 160 of slide 28 to a position wherein the end thereof is positioned adjacent lower extremity 190 of the slot. Stop 186 moves into engagement with surface 58 of closing blade 48 for limiting movement of the finger to prevent inadvertent overtravel thereof which would cause premature movement of slide 28.

The opening blade moves toward its aperture unblocking position, under the influence of drive spring 72, to initiate an exposure interval. During its movement, the opening blade opens switch $S_2$ to activate circuit means 98 to initiate the timing operation and closes switch $S_3$ to ignite the photoflash lamp directed toward the scene to be photographed in timed relationship to initiate aperture unblocking movement of the opening blade.

The timing operation initiated by opening of switch $S_2$ is completed a predetermined interval after initiation thereof in accordance with the operation of timing circuit 98. The completion of the timing operation deenergizes coil 102. Spring 74 acting on closing blade 48 then advances the closing blade toward and to its aperture blocking position to end the exposure interval. Initial movement of the closing blade permits $S_4$ to open according to its bias to thus open circuit 99. In its aperture blocking position, the closing blade abuts the opening blade and is biased into continuous contact therewith by spring 74.

During movement of the closing blade toward its aperture unblocking position, surface 58 of the closing blade moves away from stop 186 to permit further clockwise movement of latch 18 and motion-transmitting means 32. Cam 60 extends radially outwardly from the closing blade and radially beyond raised surface 65. Thus, upon aperture blocking movement of the closing blade, cam 60 strikes projection 94 of latch 18 to impart a second clockwise movement to the latch and therefore to finger 184. The latch and the finger, at this point, act as an operator for the escapement mechanism. This second movement of the finger drives slide 28 downward, against the upward bias of spring 30. Cam surface 60 passes from beneath projection 94 to permit projection 94 to return to contact with raised surface 65 and to permit finger 184 to return to the position it occupied after its first clockwise movement. Spring 30 returns the slide to its upper position upon return of finger 184 to the aforesaid position. A quick down and up movement of the slide is thus obtained.

Figure 4B:
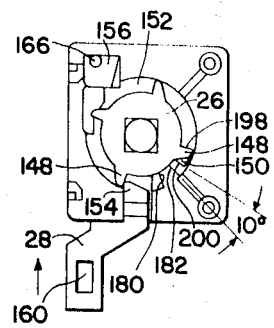
Figure 4C:
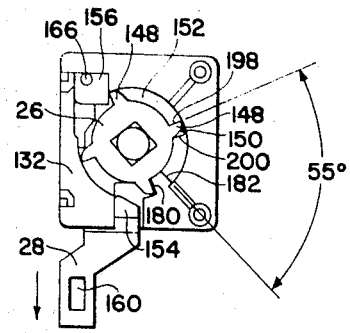

Downward movement of the slide disengages first pallet 154 from a tooth 148 of the escapement wheel with which it is shown engaged in FIG. 4b to permit rotation of the wheel, under the influence of spring 30, to the position shown in FIG. 4c. In the position of FIG. 4c, second pallet 156 is located to engage another tooth 148 of the escapement wheel for limiting rotation of the wheel. In the embodiment shown, the pallets and teeth are positioned to permit substantially 45° of rotation.

Figure 4D:
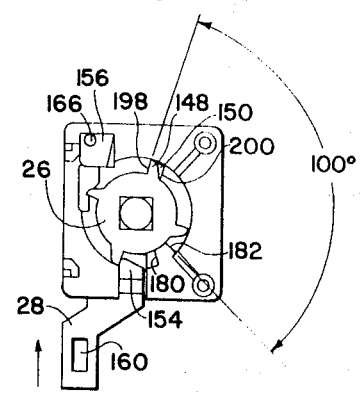

The upward movement of the slide displaces pallet 156 from the tooth with which it is shown engaged in FIG. 4c and thus permits further rotation of the escapement wheel to the position shown in FIG. 4d. The teeth on the escapement wheel are so arranged that the two increments of the rotation permitted by the down and up movement of the slide together constitute a 90° rotation. A 90° rotation is appropriate for directing another of the photoflash lamps toward the scene to be photographed.

Each of the photoflash lamps is directed toward the scene to be photographed and ignited in turn, in response to operation of the shutter means.

Figure 4E:
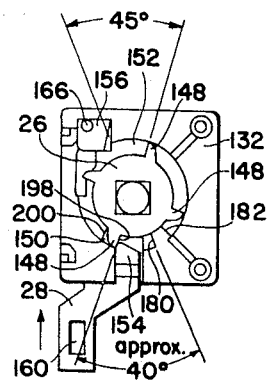

When the last (fourth) photoflash lamp is directed toward the scene to be photographed, projection 150 on the escapement wheel 26 is positioned along circular slot 152 so that surface 198 thereof is angularly displaced from end 180 of the circular slot by approximately 40°, as seen in FIG. 4e. In response to operation of the shutter, downward movement is imparted to slide 28, as described above, to permit the tooth of the escapement wheel shown in in FIG. 4e as retained by first pallet 154 to be released for movement under the influence of drive spring 30. Second pallet 156 moves downward into position for engaging another of the teeth 148 of the escapement wheel as described above, but just prior to engagement of the second pallet by one of the teeth, surface 198 of projection 150 abuts end 180 of circular slot 152 to terminate rotation of wheel 26 and thus the photoflash lamp package. The photoflash apparatus is now returned to the position of FIGS. 1 and 4a wherein the teeth of the escapement wheel are so located that they are not engageable by the first and second pallets, and the faces of the photoflash lamp package are all oriented at approximately a 40° angle relative to the plane of the scene to be photographed. This orientation serves to indicate that all the lamps in the package are exhausted and that a new package is needed.

After termination of the exposure interval and rotation of the photoflash lamp package, knob 116 is released. Spring 118 raises knob 116 relative to shaft 114; spring 70 rotates control means 14 in the clockwise direction toward and to its first position, and offset 122 of the control means lifts shaft 120 upwardly to its raised position. Upward movement of knob 116 opens switch S₁ and thus breaks circuit 98. During clockwise rotation of the control means, abutment means 68 engages surface 192 of opening blade 46 to rotate it in the clockwise direction toward and to its aperture blocking position and the abutting relationship between the opening blade and closing blade 48 effects rotation of the closing blade toward and to its aperture unblocking position wherein it closes switch S₄. Return of the opening blade to its aperture blocking position returns switch S₂ to its closed condition and permits S₃ to open.

Spring 70 exerts a continuous clockwise biasing force upon the control element; the control element in turn exerts a force upon the opening and closing blades for continuously urging keeper 106 into firm contact with core 100. It should be observed that during the respective clockwise movements of control means 14, opening blade 46 and closing blade 48, there is no relative movement between the aforesaid opening and closing blades and the control element. Thus, spring 70 does not have to exert a return force sufficient to overcome the forces of springs 72 and 74; it need only be strong enough to exert the requisite force for maintaining keeper 106 and core 100 in firm contact.

During return movement of the opening and closing blades and the control means, projection 94 moves off surface 65, over cam 60 and onto edge 210 of the closing blade. Projection 94 rides along edge 210 until offset portion 47 of the opening blade passes beyond it. Spring 96 then advances arm 90 in a counterclockwise direction so that projection 94 engages portion 47 of blade 46. The apparatus is thus returned to its original rest position. Upon return of the shutter means to its rest position and movement of projection 94 into engagement with portion 47, finger 184 is permitted to return to upper portion 188 of slot 160, as shown in FIG. 1.

The exhausted package is now removed, a new package is inserted, and the photoflash apparatus is again wound as described above for production of further photoflash exposures.

Reference is now made to FIGS. 5, 6 and 7 which illustrate in detail a preferred embodiment of this invention.

This embodiment includes a photographic shutter means and means for mounting and sequentially igniting a plurality of photoflash lamps. It is usable in conjunction with a multilamp photoflash assembly which may be of the type designated by numeral 25 in FIG. 6.

The shutter means includes lens 308, base plate means 310 defining an exposure aperture, shutter blade means 312, blade control means 314, drive means 316, latch means 318, retaining means 320 and operating means 322. The photoflash lamp mounting and igniting means includes rotatable socket means 324 for detachably receiving multilamp photoflash assembly 25, escapement wheel 326 mounted adjacent the socket means, slide 328 for controlling movement of the escapement wheel, cover 331, base 432 and motion-transmitting means 332 extending from latch means 318 to engagement with slide 328 for transmitting motion of shutter 312 to slide 328.

The photographic shutter means will now be described.

Shutter blade means 312 includes opening blade means 346 and closing blade means 348, each pivotally mounted upon pin 350 for aperture blocking and unblocking movement, pin 350 being mounted in base plate means 310. The closing blade means includes light seal 352 and blade portion 354. The blade portion is pivotally mounted upon pin 350 and the light seal is configured for overlying relationship with opening blade means 346. Blade portions 354 is mounted in coplanar relationship with blade 346. Referring to FIG. 5, an edge of blade portion 354 abuts an edge of blade 346. Blade means 348 also includes surface 358 and a somewhat elongated cam 360. Blade 346 includes offset 347 for cooperation with latch means 318.

Blade control means 314 comprises capping blade 362 pivotally mounted upon pin 350 for movement between first and second positions. The capping blade forms cam 364 and aperture 366 and supports abutment 368. Cam 364 is relative to pin 350, located radially inwardly of cam 360 on blade 348. The purposes of the cams will hereafter be apparent. The abutment extends into the path of movement of the opening blade means and, due to the abutting relationship of the opening and closing blades, limits counterclockwise movement of both the opening and closing blades. Spring 370 continuously biases the capping blade in a clockwise direction toward its first position. When the capping blade moves toward its first position, abutment 368 engages opening blade 346 and urges the opening blade and closing blade 348 clockwise, toward their respective aperture blocking and unblocking positions. Retaining means 320 is positioned adjacent the aperture unblocking position of closing blade 348 for limiting clockwise motion. Since spring 370 continuously biases the control means in the clockwise direction, blade 348 is continuously and firmly pressed against the retaining means, for reasons which will hereafter be described.

Drive means 316 includes drive springs 372 and 374 for blade 346 and blade 348, respectively. Spring 374 is coiled axially of pin 350 and includes end portion 376 which extends radially of pin 350 to engage closing blade 348 at 378 and end portion 380 which extends radially from the pin and engages control means 314 at 382. Similarly, spring 372 is coiled axially of pin 350 and includes end portions 384 and 386 which extend radially from the pin and engage opening blade 346 at 388 and control means 314 at 382, respectively. Drive spring 372 is preloaded to bias the opening blade for counterclockwise rotation, about the pin while biasing the capping blade for clockwise rotation, thus biasing the opening blade against the abutment 368 of the capping blade. Spring 374 is preloaded to bias the closing blade for counterclockwise rotation about the pin while biasing the capping blade for clockwise rotation. All three of the above described blades may be moved together, as a unit, without influencing the condition of drive springs 372 and 374; the condition of the drive springs being affected only when there is relative motion between the blades. The preloaded condition of the springs serves to maintain the elements in their proper relative positions when the apparatus is in the rest position.

Latch means 318 for releasably holding opening blade 346 in its aperture blocking position against the bias of spring 372 is supported by motion-transmitting means 332 in position for releasably engaging an offset portion 347 of opening blade 346. Spring 396 exerts a counterclockwise bias upon means 332.

Retaining means 320 comprises a releasable electromechanical holding device 397 responsive to electrical circuit means 398 for controlling exposure duration in accordance with scene brightness.

The holding device may involve an electromagnet including U-shaped core 400 and electrically energizable coil 402 wound around one leg of the core, coil 402 being included in circuit 398. The free ends, 404, of the core are coplanar and cooperable with magnetizable keeper 406 mounted upon closing blade means 348. The core of the electromagnet is positioned adjacent the aperture unblocking position of the closing blade means for contact with the keeper when the closing blade is in the aforesaid aperture unblocking position, the core and keeper being so arranged that surface 408 of the keeper contacts surfaces 404 of the U-shaped core to define a magnetic circuit. When coil 402 of the electromagnet is energized, a sufficient magnetomotive force is applied to the magnetic circuit to hold the keeper against the core and thus retain the closing blade in aperture unblocking position.

One example of circuit means 398 suitable for use with the exposure control apparatus of this invention is shown in FIG. 7. This circuit means incorporates timing circuit 220 and trigger circuit 222.

Timing circuit 220 is connected between terminals 228 and 230 of circuit means 398 so as to form an integrator circuit, the input terminal of which is at 228 and the output terminal of which is between resistance element 226 and photoresponsive element 224 at connection 234. Connection 234 is connected by fixed impedance 238 to the base electrode of transistor $Q_1$ of trigger circuit 222.

The timing circuit includes photoresponsive element 224, such as a cadmium sulfide photocell or the like exposed to light from the scene being photographed and characterized by a resistance related to the level of scene brightness, capacitor $C_1$ and resistance element 226. Resistance element 226 is a compensating element for flash photography. Element 226 is effectively included in circuit 220 during operation according to the flash mode and shorted out during operation according to the ambient mode through line 229 which extends from terminal 234, in parallel with resistor 226. Circuit 220, in the preferred embodiment, also includes compensating resistor 227 arranged for parallel connection with element 224 during photoflash operation for limiting the duration of the exposure interval during operation according to the flash mode to a predetermined maximum period of time. Element 224 normally controls the duration of the exposure interval. However, when the level of light reflected from the scene to be photographed is low, an undesirably long exposure interval may be produced. When this condition exists, the resistance of element 224 is higher than the resistance of resistor 227, thus permitting resistor 227 to control. The timing circuit further includes switch $S_5$ for switching the system between ambient and flash modes. The switch is of the single pole, double throw type. Arm 239 of switch $S_5$ extends from terminal 238 and is arranged for connection with either terminal 223 or 241. When arm 239 contacts terminal 223, the circuit through resistor 227 is broken and resistor 226 is shorted through line 229. When arm 239 is moved into contact with terminal 241, the circuit through resistor 227 is completed and line 229 is opened to effectively include resistor 226 in circuit 220. Circuit 220 thus constitutes an integrating circuit operable according to a flash mode and an ambient mode, the ambient mode effectively excluding both resistor 226 and 227 and the flash mode effectively including both of these resistors.

Trigger circuit 222 may be, for example, a transistorized two stage Schmitt-type trigger circuit responsive to output voltage from timing circuit 220. A circuit of this type is fully explained in connection with the control circuit described in the aforementioned U.S. Pat. No. 3,205,802. Trigger circuit 222 has an input that is a normally not-conducting stage including transistor $Q_1$ and an output that is a normally conducting stage including transistor $Q_2$. While the two stages of the trigger circuit are referred to as "normally not-conducting" and "normally conducting," it should be obvious that this characterization is applicable only when a voltage source is supplied across terminals 228 and 230.

Voltage source 240 is shown in the form of a battery of potential $E_o$ connected between terminal 228 and terminal 230 through normally open switch $S_1$. Switch $S_1$ is closed to apply voltage across the terminals by operator means 322 which also initiates exposure producing operation of the shutter means.

Operator means 322 includes spring 418, having hollow portion 415 for receiving spring 418 and shaft 414, knob 416. The shaft is mounted for reciprocal movement relative to pin 350; end 420 thereof is engageable with bent over portion 422 of control means 314 for operating shutter means 312 by imparting counterclockwise rotation to the control means when the operator means is moved downwardly. Initial operation of means 322 closes switch $S_2$. Spring 418 biases knob 416 and shaft 414 in opposite directions axially of the shaft. Spring 418 is substantially weaker than spring 370 so that, upon depression of knob 416, the knob will move downwardly through distance "$d$" before movement is imparted to the shaft. Switch $S_1$ includes fixed terminal 280 and terminal 281 biased toward contact with terminal 280. Switch operating lever 283 is mounted on means 310 by structure 284 and member 285 so that portion 286 thereof engages terminal 281 for moving it against its bias away from terminal 280, when arm 287 of lever 283 is moved in the upward direction; the bias of terminal 281 tends to bias arm 287 in the downward direction. Arm 287 rests on extension 288 of button 416 so that the upward bias of the button raises arm 287 and holds switch $S_1$ open until the button is depressed. Initial depression of button 416 causes extension 288 to move away from arm 287 and thus permits switch $S_1$ to close. It can be appreciated that this apparatus closes switch $S_1$ in response to initial operation of means 322 and then moves out of position for influencing the switch until button 416 is released. This permits the terminals of switch $S_1$ to be independent of means 322 when they are in contact and thereby eliminates any tendency for rubbing and sliding movement of the contacts relative to each other to develop.

In the shutter mechanism, the first shutter blade is movable from an initial aperture blocking position to an aperture unblocking position for initiating exposure and the second blade is movable from an initial aperture unblocking position to an aperture blocking position for terminating exposure. The second blade is releasably retained in its aperture unblocking position subsequent to movement of the first blade to its aperture unblocking position by energized electromagnetic means. Circuit means 398 is designed to cut off the flow of current to the electromagnet to free the second blade for movement to its aperture blocking position a timed interval after aperture unblocking movement of the first blade. This operation is accomplished by operation of switch $S_2$.

Switch $S_2$ is mounted adjacent the opening blade 346 and includes pole 410 and 412 wherein pole 410 is movable into and out of contact with pole 412 in accordance with the position of the opening blade. Switch $S_2$ is operated by switch operating means 294 which includes arm 289 rotatably mounted upon pin 350, adjacent base plate means 310, and spring means 292 for producing a counterclockwise bias upon arm 289. Arm 289 includes projections 290 and 291. These projections are arranged on opposite sides of pole 410 such that, when arm 289 is permitted to rotate in the counterclockwise direction according to its bias, projection 291 moves pole 410 away from pole 412; when arm 289 is moved against its bias, projection 290 engages pole 410 and moves it into contact with pole 412. Arm 289 is movable against the bias of 290 to hold arm 289 in a relatively clockwise position wherein switch $S_2$ is closed, counterclockwise movement of arm 289 being permitted only upon counterclockwise movement of opening blade means 346. Initial opening movement of the opening blade permits counterclockwise movement of arm 289 so that projection 291 may move pole 410 out of contact with pole 412.

It can be appreciated that according to the construction described above, switch $S_2$ is not influenced by any movement of the opening blade which may occur prior to its release. In this manner, the tendency of rubbing and sliding movement to occur between the poles of switch $S_2$ prior to release of the opening blade, due to slight premature movement of the opening blade, is eliminated.

Operation of control circuit means 398 according to the ambient mode will now be briefly described, a more complete description being included in the aforementioned U.S. Pat. No. 3,205,802. Arm 239 of switch $S_5$ is in contact with terminal 223 so that the circuit through resistor 227 is broken and resistor 226 is shorted out by completion of a circuit through line 229.

At the instant switch $S_1$ is closed, and before switch $S_2$ is opened in response to movement of blade 346 from its aperture blocking position, a ground potential voltage is applied at terminal 234 and coil 402 is energized to hold closing blade 348 in its aperture unblocking position. When switch $S_2$ is opened, there appears at output terminal 234 a voltage which changes from the initial value, e.g., ground potential, to a predetermined value during a period of time dependent upon the value of capacitor $C_1$ and the resistance of photoresponsive element 224. When the potential at terminal 234 reaches the aforesaid predetermined value, the normally not-conducting input is forward biased and conducts whereupon the normally conducting output is switched to its not-conducting stage, when the output is switched to its not-conducting stage, coil 402 of the electromagnet is deenergized to release the closing blade for exposure terminating movement.

When the steady state or ambient illumination drops below the design level at which the exposure duration becomes greater than about 125 ms., it becomes impractical to hold the camera by hand sufficiently steady to achieve consistently good results. In such case, flash illumination must be used. To this end, flash circuit 99 including flash ignition switch $S_3$ and means for supporting and illuminating flash lamp 242 are connected across battery 240. Switch $S_3$ is biased open and positioned in the path of movement of capping blade 362 for closure by final movement of the capping blade. In point of time, the closing of $S_3$ occurs just after release of opening blade 346, at about the same time the opening blade reaches unblocking position.

When operation is according to the photoflash mode, the circuit functions in the same manner except that the presence of resistor 226 reduces the trigger generation time and thus duration of the exposure interval. Resistor 227 in parallel with photoresponsive element 224 serves to limit the duration of the exposure interval to a predetermined fixed time under conditions wherein relatively little light is reflected from the scene to be photographed onto the photoresponsive element but, under other conditions, it has no effect. The function of resistor 227 is fully described in U.S. Pat. No. 3,326,103 which issued to J. M. Topaz on June 30, 1967.

The photoflash lamp mounting and igniting means will now be described.

Socket means 324 includes element 424 and member 426. Element 424 includes angularly configured collar 428 for fixedly mounting escapement wheel 326 and circular shaft portion 430 extending from the collar for rotatably mounting element 424 in base plate 432. The element further includes four equally spaced extensions 434 surrounding a central opening 436 which extends through collar 428 and shaft 430, centrally thereof. One pair of opposed extensions include shoulders 438 having bearing surface 439 for cooperation with thrust bearing surface 440 on annular ring 441 of member 331. Surfaces 443 of shoulders 438 act as retainers for spring 30 when socket means 324 is assembled. Member 426 comprises flat platelike portion 444 from which four spring fingers 446, including offsets 447, have been struck and bent upward for location between extensions 434. Opening 455 having a shape complementary to that of collar 428 is disposed centrally of portion 444 so that member 426 may be mounted upon the collar, between escapement wheel 326 and element 424. By this arrangement, assembly 25 may be releasably retained in the socket means in a manner to be hereafter described.

Switch $S_5$ is mounted adjacent the side of base 432 opposite escapement wheel 326 and positioned for operation by an elongated member 449. Elongated member 449 defines end 451 and enlarged head 453, and extends through opening 436 into engagement with resilient pole 239 of switch $S_5$. Fixed terminals 223 and 241 of switch $S_5$ are positioned on opposite sides of resilient pole 239, and pole 239 is resiliently biased into contact with terminal 223. Due to the engagement between member 449 and resilient pole 239, pole 239 continuously biases member 449 toward offsets 447 on fingers 446 so that head 453 is biased into engagement with the offsets.

When photoflash assembly 25 is to be installed, center post 42 is advanced into opening 436 so that lugs 44 pass between extensions 434 and press against offsets 447 of spring fingers 446. As the post is inserted, spring fingers 446 are cammed outward and over the lugs, into retaining engagement with them. Simultaneously with advancement of post 44 into opening 436, member 449 is depressed to move pole 239 of switch $S_5$ out of contact with terminal 223 and into contact with pole 241. Assembly 25 is removed by simply pulling it from the socket means with sufficient force to again cause spring fingers 446 to cam over lugs 44. Pole 239 then moves back into contact with terminal 223 and returns member 149 to its position against offsets 147.

Escapement wheel 326 is mounted, as aforesaid, upon collar 428 of element 424. The escapement wheel is thus fixedly mounted relative to element 424 and rotatable relative to base 432. Four teeth 448 extend radially from the wheel for cooperation with slide 328 and projection 450 extends from one tooth for cooperation with circular slot 452 in base 432.

Slide 328 carries first pallet 454 and second pallet 456 and is mounted in base 432 for reciprocal sliding movement. Movement of slide 328 permits controlled rotation of escapement wheel 326 and hence socket means 324. Extension 458 of the slide forms opening 460 for operatively receiving motion-transmitting member 332. Opening 460 is elongated to permit a predetermined amount of movement of the motion-transmitting member relative to slide 328. The slide is mounted beneath base 432 and pellets 454 and 456 extend through openings 462 and 464 of the base for their engagement with the escapement wheel. Post 466 extends upwardly from pallet 456. Spring means 463 engages post 466 for biasing the slide for movement in the upward direction.

Drive spring 330 comprises a coil spring wound about a core formed by extensions 434 of element 424 and fingers 446. One end of the spring is fixedly mounted to one of the extensions at 468; the other end is attached to post 465 on base 432. The spring is wound to bias the rotary parts for counterclockwise movement.

Cover 331 includes thrust bearing surface 440, terminals 472 and channel 474. Terminals 472 cooperate with terminals 40 to place the flash lamp directed toward the scene to be photographed in photoflash circuit 99. Channel 474 permits unobstructed movement of terminals as the photoflash lamp assembly rotates. Members 470 on base 432 cooperate with cover 331 to mount the cover to the base so that socket means 324, drive spring 330 and wheel 326 are supported between them. Shaft 430 extends through circular opening 478 in the base; bearing shoulders 438 are retained by thrust bearing 440.

Circular slot 452 in base 432 includes an interrupted sector which defines slot ends 480 and 482 for controlling photoflash lamp package rotation as hereafter described.

Motion-transmitting means 332 comprises finger 484 which extends through opening 460 in the slide and stop 486. Spring 396 biases member 332 and latch means 318 thereon for counterclockwise rotation about pivot pin 392, thus finger 484 urges the slide upward. The finger will normally engage upper extremity 488 of opening 460. Motion-transmitting means 332 is movable through first and second increments of clockwise rotation, as will hereafter be explained. The first increment of clockwise rotation advances finger a predetermined distance downwardly to lower extremity 490 of opening 460. Downward motion is so limited that the finger is not sufficiently advanced to transmit motion to the slide. Stop 486 extends from the motion-transmitting member to engage an edge of blade means 348 and positively limit downward motion of finger 484 until other operations take place. When the second increment of downward motion is imparted to the finger, it drives slide 328 downward against the bias of spring 463.

Operation of the above apparatus of FIGS. 5 through 7 will now be described.

The description will assume an initial rest position wherein projection 450 abuts slot end 482; opening blade 346 and closing blade 348 are in abutting relationship; spring 370 continuously biases control means 314 for clockwise movement; abutment means 368 extends from the control means into engagement with surface 492 of the opening blade so that the clockwise bias of the control means also biases the opening and closing blades for the same movement; core 400 of the electromagnet is located so that the surfaces 404 thereof are contacted by surface 408 of keeper 406 to limit clockwise movement of blades 346, 348 and 362 so that blades 346 and 362 are located in their aperture blocking positions and blade 348 is located in aperture unblocking position. Since spring 370 continuously biases the blades for clockwise movement, keeper 406 is continuously pressed into firm contact with surfaces 404 of the core. A small gap is formed between the opening blade and latch means 318 when the blades are held in the above described positions by spring 370.

The photoflash apparatus is shown in its unwound condition wherein socket means 324 is so positioned that each of the four faces 34 of an assembly 25 installed in socket means 324 would be oriented at approximately a 40° angle relative to a plane of the scene being photographed (i.e. relative to a plane perpendicular to the optical axis 496). In this condition, surface 498 of projection 450 abuts end portion 480 of slot 452 to prevent further rotation of the assembly and to locate teeth 448 of the escapement wheel so that pallets 454 and 456 of slide 328 do not intercept the teeth upon up and down movement thereof. For purposes of discussion it will be taken that, in this rest condition, photoflash assembly 25 is not installed. Pole 239 of switch $S_5$ is thus in contact with terminal 223 in accordance with its bias. The circuit is thus set for operation according to the ambient mode, resistor 226 being short circuited through line 229 and resistor 227 being disconnected by the condition of switch $S_5$.

To initiate photography according to the flash mode, a photoflash lamp package, or assembly, designated 25, is inserted into and retained within the socket means as described above. Insertion of assembly 25 moves member 449 to thereby move pole 239 against its bias, out of contact with terminal 223 and into contact with terminal 241. Resistors 226 and 227 are then included within circuit 220. The assembly is then manually rotated clockwise to tension drive spring 330. The apparatus is fully tensioned when surface 500 of projection 450 engages end 482 of slot 452. The shapes of pallets 454 and 456 and teeth 448 of the escapement wheel are such that manual clockwise rotation of socket means and escapement wheel is freely permitted. The ends of the circular slot are so located that the photoflash lamp package is permitted to move through an angular rotation of approximately 320°. When surface 500 abuts end 482 of slot 452 none of the faces of assembly 25 are precisely directed toward the scene to be photographed; an overtravel of approximately 10° having been provided. Upon release of the assembly after manual rotation, the tension in drive spring 330 advances socket means 324 and escapement wheel 326 substantially 10° counterclockwise to take up the overtravel and position the assembly so that one face thereof is directed toward the scene to be photographed, one of the teeth 448 then being releasably retained by pallet 454 to prevent further rotation of the escapement wheel under the influence of the drive spring. When this position is obtained, the terminals designated 40 for the one flash lamp directed toward the scene to be photographed are in electrical contact with terminals 472 of the photoflash apparatus. The one flash lamp is thus positioned in the photoflash circuit to be ignited in timed relationship with exposure producing operation of the apparatus.

The events which occur as a result of downward movement of knob 416 and shaft 414 to produce an exposure will now be described.

Initial downward movement of the knob through distance "d" causes extension 288 of knob 416 to move downward and away from arm 287 so that lever 283 is permitted to move to thereby permit closure of the contacts of switch $S_1$. Closure of switch $S_1$ energizes timing circuit 398 and coil 402 of an electromechanical holding device 397 to prevent forward movement of closing blade means 348 according to the bias of its drive spring, which movement would otherwise occur upon the subsequent movement of blade 346. Energization of the coil provides, in the magnetic circuit of core 400 and keeper 406, a magnetic induction sufficiently large to create a force on the keeper for holding the closing blade in its initial position against the bias of its drive spring independently of movement of opening blade 346.

Further downward movement of the knob effects downward movement of shaft 414. End 420 thereof engages offset 422 of control means 314 and rotates the control means counterclockwise from its first position toward its second position, against the bias of spring 370. Movement of the control means removes abutment means 368 from engagement with surface 492 of the opening blade. The opening blade moves slightly within its aperture blocking position to close the aforementioned gap and is releasably held in aperture blocking position by latch means 318.

Counterclockwise movement of control means 314, while movement of the opening and closing blade is arrested, "winds" drive springs 372 and 374 to store a predetermined amount of energy therein in addition to the energy stored therein due to the preloaded condition. Control means 314 ultimately reaches a position wherein cam surface 364 engages latch means 318. A further increment of movement carries the control means to its second position wherein it causes latch means 318 to release the opening blade, closes flash ignition switch $S_3$ and then lies in unblocking relationship with the exposure aperture. The aforesaid further increment of movement causes cam surface 364 to move latch means 318 clockwise, off opening blade 346, to release the opening blade for movement. The flash ignition switch $S_3$ is closed just prior to release of the opening blade, in the predetermined timed relationship therewith, so that the light output from the flash bulb begins to increase about the same time the opening blade reaches unblocking position; the light reflected from the scene being photographed then influences the current flow through element 224 and the charge of capacitor $C_1$. Latch means 318 remains upon raised cam surface 364 and is thereby prevented from returning to its original position under the influence of biasing spring 396. Movement of the latch causes a first clockwise movement of finger 484 and stop 486. The finger is moved downwardly within slot 460 of slide 328 to a position wherein the end thereof is positioned adjacent lower extremity 490 of the slot. Stop 486 moves into engagement with surface 358 of closing blade 348 for limiting movement of the finger to prevent inadvertent overtravel thereof which would cause premature movement of slide 328.

The opening blade moves toward its aperture unblocking position, under the influence of drive spring 372, to initiate an exposure interval. As this movement occurs, extension 293 of the opening blade moves out of engagement with projection 290 to permit arm 289 to move counterclockwise under the influence of spring means 292. Projection 291 then moves terminal 410 to open switch $S_2$, when switch $S_2$ is opened, circuit means 398 is activated to initiate the timing operation.

The timing operation initiated by opening of switch $S_2$ is completed, in the manner described above, a predetermined interval after initiation thereof. The completion of the timing operation deenergizes coil 402. Spring 374 acting on closing blade 348 then advances the closing blade toward and to its aperture blocking position to end the exposure interval. In its aperture blocking position, the closing blade abuts the opening blade and is biased toward continuous contact therewith by spring 374.

During movement of the closing blade toward its aperture blocking position, surface 358 of the closing blade moves away from stop 486 to permit further clockwise movement of motion-transmitting means 332. Cam 360 extends further radially outwardly from the longitudinal axis of pin 350 than does cam 364 on the capping blade. Thus, upon aperture blocking movement of the closing blade, cam 360 strikes latch means 318 to impart a second clockwise movement to finger 484. The latch and the finger, at this point, act as an operator for the escapement mechanism. This second movement of the finger drives slide 328 downward, against the upward bias of spring 463. Cam surface 360 is elongated so that latch means 318 remains thereupon until button 416 is released; slide 328 is therefore held in its downward position.

Downward movement of the slide disengages first pallet 454 from the tooth 448 of the escapement wheel with which it is engaged to permit rotation of the wheel, under the influence of spring 330. The escapement wheel advances approximately 45° to an intermediate position wherein another of the teeth designated 448 is engaged by pallet 456.

After termination of the exposure interval and the aforesaid 45° rotation of the photoflash lamp package, knob 416 is released. Spring 418 raises knob 416 relative to shaft 414; spring 370 rotates control means 314 in the clockwise direction toward and to its first position, and offset 422 of the control means lifts shaft 420 upwardly to its raised position. Upward movement of knob 416 raises arm 287 to open switch $S_1$ and thus breaks circuit 98. Initial clockwise rotation of the control means permits switch $S_3$ to open and subsequently causes abutment means 368 to engage surface 492 of opening blade 346 to rotate the opening blade in the clockwise direction toward and to its aperture blocking position; the abutting relationship between the opening blade and closing blade 348 effects rotation of the closing blade toward and to its aperture unblocking position. Upon return of the opening blade to its aperture blocking position extension 293 thereof advances arm 289 clockwise until projection 290 moves terminal 410 of switch $S_2$ into contact with terminal 412.

Spring 370 exerts a continuous clockwise biasing force upon control means 314; the control means in turn effects a force upon the opening and closing blades for continuously urging keeper 406 into firm contact with core 400. It should be observed that during the respective clockwise movements of control means 314, opening blade 346 and closing blade 348, there is no relative movement between them. Thus, spring 370 does not have to exert a return force sufficient to overcome the forces of springs 372 and 374; it need only be strong enough to exert the requisite force for maintaining keeper 406 and core 400 in firm contact.

During return movement of the opening and closing blades and the control means, projection 394 moves off cam surface 364, over cam 360 and onto edge 510 of the opening blade. At this time motion-transmitting means 332 is permitted to move counterclockwise under the influence of spring means 396. This raises finger 484 to upper portion 488 of opening 460 and allows spring means 463 to raise slide 328. Upward movement of the slide displaces pallet 456 from the tooth with which it is engaged and permits a further rotation of substantially 45° of escapement wheel 326. The two increments of rotation permitted by the down and up movement of the slide produce an amount of rotation (90°) appropriate for locating the next succeeding flash lamp in electrical contact with terminals 472.

After latch means 318 moves off cam 360 it rides along edge 510 of opening blade 346 until offset portion 347 of the opening blade passes beyond it. Spring 396 then advances means 332 and latch means 318 in a counterclockwise direction until latch means 318 engages portion 347 of blade 346. The apparatus is thus returned to its original rest position.

Upon each successive exposure producing operation of the shutter, the escapement wheel advances in the above manner to direct successive lamps toward the scene to be photographed and locate their terminals in contact with terminals 472. When the last (fourth) photoflash lamp is directed toward the scene to be photographed, projection 450 on the escapement wheel 326 is positioned along circular slot 452 so that surface 498 thereof is angularly displaced from end 480 of the circular slot by approximately 40°.

In response to one further operation of the shutter, downward movement is imparted to slide 328, as described above, to permit the tooth of the escapement wheel retained by first pallet 454, to be released for an approximately 45° rotation under the influence of drive spring 330. Second pallet 456 moves downward into position for engaging another of the teeth 448 of the escapement wheel as described above, but just prior to engagement of the second pallet by one of the teeth, surface 498 of projection 450 abuts end 480 of circular slot 452 to terminate rotation of wheel 326 and thus the photoflash lamp package. The photoflash apparatus is now returned to its original position wherein the teeth of the escapement wheel are so located that they are not engageable by the first and second pallets. In this position, the faces of the photoflash lamp package are all oriented at approximately a 40° angle relative to the plane of the scene to be photographed. This orientation serves to indicate that all the lamps in the package are exhausted; thus a new lamp supply is needed if photoflash photography is to be continued. If photography is to be according to the ambient mode, the assembly 25 should be removed. Member 449 then frees terminal 239 of switch $S_5$ for movement from terminal 241 into contact with terminal 223, thus conditioning the control circuit for operation according to the ambient mode.

Since human reaction time involved in operating the apparatus described above substantially exceeds the longest average exposure apt to be used under normal "snapshot" conditions of scene brightness, the contacts of switch $S_1$ will be closed for at least as long as the correct exposure time.

It should be understood that the terms "up," "down," "clockwise" and "counterclockwise" and the like are used in the foregoing disclosure to describe movement of various elements as seen in the figures and are not intended to be used in a limiting sense.

Since certain changes may be made in the above apparatus without departing from the scope of the invention herein involved, it is intended that all matter contained in the above description or shown in the accompanying drawings shall be interpreted as illustrative and not in a limiting sense.

I claim:

1. Exposure control apparatus for a photographic camera comprising:
    a. a photographic shutter having opening shutter blade means movable from a first position to a second position for initiating exposure, and closing shutter blade means for terminating exposure;
    b. means for detachable mounting and retaining a flashlamp assembly having a plurality of flashlamps; and
    c. indexing means responsive to operation of said closing shutter blade means for moving said mounted flashlamp assembly and sequentially advancing the flashlamps from 2. Exposure control apparatus according to claim 1 further comprising means interconnecting said indexing means to said shutter for operating the indexing means in response to operation of said shutter.

3. Exposure control apparatus for a photographic camera comprising:
   a. shutter means movable from an initial position to a terminal position for initiating and terminating an exposure interval;
   b. means for returning said shutter means from said terminal position to said initial position subsequent to said exposure interval termination;
   c. means for detachably mounting and retaining a flash lamp assembly having a plurality of flash lamps; and
   d. indexing means responsive to said shutter means movement to terminate a said exposure interval and to said shutter means return movement toward said initial position for sequentially advancing said flash lamps to a predetermined operative position.

4. An exposure control mechanism for a photographic camera having an aperture through which light is admitted to produce a photographic exposure comprising:
   a. first shutter blade means movable from an initial position to a final position to initiate exposure through said aperture;
   b. second shutter blade means movable from an initial position to a final position for terminating exposure through said aperture;
   c. means for detachably mounting and retaining a flash lamp assembly having a plurality of flash lamps;
   d. escapement means operable to move the mounted flash lamp assembly and sequentially advance the flash lamps to a predetermined operative position;
   e. synchronization switch means operable in timed relationship to the release of said first shutter blade means for completing an electrical circuit through the flash lamp mounted in said predetermined operative position; and
   f. an escapement operator extending into the path of movement of said second shutter blade means for operating said escapement means in response to movement of said second shutter blade means.

5. An exposure control mechanism according to claim 4 wherein said escapement means is operable to move one of said flash lamps away from said predetermined position and another of said flash lamps toward said predetermined position in response to movement of said section shutter blade means from its initial position toward its final position.

6. An exposure control mechanism according to claim 4 further comprising means for returning said first and second shutter blade means to their respective initial positions subsequent to termination of exposure wherein said escapement means is operable to move one of said flash lamps from said predetermined position in response to movement of said second shutter blade means from its initial position toward its final position and to move another lamp into said predetermined position in response to return movement of said said second blade means from its final position toward its initial position.

7. Exposure control apparatus for photographic camera comprising:
   a. shutter means operable to unblock an exposure aperture to initiate an exposure interval and to block said exposure aperture to terminate said exposure interval;
   b. socket means for detachable receiving a multilamp photoflash assembly;
   c. a photoflash circuit, in which a selected one lamp of said assembly is located, for igniting said one lamp in timed relationship to aperture unblocking operation of said shutter means; and
   d. means responsive to aperture blocking operation of said shutter means for sequentially advancing said socket means to place successive other lamps of said assembly in said photoflash circuit.

8. Exposure control apparatus according to claim 7 wherein said socket means is rotatably mounted and said means for sequentially advancing said socket means comprises:
   a. a rotatably mounted escapement wheel;
   b. means for biasing said escapement wheel for rotary movement; and
   c. pallet means movable in response to aperture blocking operation of said shutter means for permitting controlled rotary movement of said escapement wheel under the influence of said biasing means for rotating said socket means.

9. Exposure control apparatus according to claim 8 wherein said pallet means is reciprocally movable and comprises means engageable with said escapement wheel biasing means, said pallet means being movable in one direction in response to aperture blocking movement of said shutter means, said escapement wheel biasing means being effective to bias said pallet means for movement in the direction opposite said one direction.

10. Exposure control apparatus for a photographic camera comprising:
    a. an exposure aperture;
    b. shutter blade means mounted for unblocking and blocking movement relative to said aperture;
    c. rotatable socket means for detachably receiving an assembly containing a plurality of photoflash lamps;
    d. a photoflash circuit;
    e. indexing means for rotating said socket means to direct said lamps toward a scene to be photographed one at a time, in succession, and to locate the lamp directed toward said scene in said photoflash circuit for ignition in timed relationship to aperture unblocking movement of said shutter blade means; and
    f. means for operating said indexing means in response to aperture blocking movement of said shutter blade means.

11. Exposure control apparatus according to claim 10 wherein said indexing means comprises:
    a. a rotatably mounted escapement wheel;
    b. means interconnecting said escapement wheel to said socket means for preventing relative rotation between said socket means and said escapement wheel;
    c. means for biasing said escapement wheel and socket means for rotary movement; and
    d. pallet means movable by said operating means in response to aperture blocking movement of said shutter blade means for permitting operative rotation of said escapement wheel and socket means under the influence of said biasing means.

12. Exposure control apparatus according to claim 11 wherein said pallet means is reciprocally movable and said means for operating said indexing means moves said pallet means in one direction, further comprising means interconnecting said pallet means and said escapement wheel biasing means, said escapement wheel biasing means biasing said pallet means for movement in the direction opposite said one direction.

13. Exposure control apparatus for a photographic camera comprising:
    a. shutter means movable from an initial position to a final position for producing a photographic exposure;
    b. means for moving said shutter means from said final position to said initial position subsequent to each photographic exposure;
    c. means for detachably mounting and retaining a flash lamp assembly having a plurality of flash lamps; and
    d. indexing means for moving said mounted flash lamp assembly and operative to advance one flash lamp from a predetermined operative position in response to exposure producing movement of said shutter means and to advance another flash lamp to said predetermined operative position in response to movement of said shutter means from said final position to said initial position.